United States Patent
Takahashi (10) Patent No.: US 9,798,351 B2
(45) Date of Patent: Oct. 24, 2017

(54) VEHICLE PEDAL

(71) Applicant: TOYOTA JIDOSHA KABUSHIKI KAISHA, Toyota-shi (JP)

(72) Inventor: Naoki Takahashi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/926,301

(22) Filed: Oct. 29, 2015

(65) Prior Publication Data

US 2016/0124457 A1 May 5, 2016

(30) Foreign Application Priority Data

Nov. 4, 2014 (JP) .................................. 2014-224526

(51) Int. Cl.
| | |
|---|---|
| G05G 1/30 | (2008.04) |
| G05G 1/48 | (2008.04) |
| G05G 1/483 | (2008.04) |
| B60K 26/02 | (2006.01) |
| G05G 1/44 | (2008.04) |

(52) U.S. Cl.
CPC ............ *G05G 1/483* (2013.01); *B60K 26/02* (2013.01); *G05G 1/44* (2013.01)

(58) Field of Classification Search
CPC ............ G05G 1/44; G05G 1/48; G05G 1/483; G05G 1/30; B60K 26/02
See application file for complete search history.

(56) References Cited

U.S. PATENT DOCUMENTS

| | | | | |
|---|---|---|---|---|
| 4,958,607 A | * | 9/1990 | Lundberg | ............... B60K 26/02 123/399 |
| 7,228,757 B2 | * | 6/2007 | Peniston | ................ G05G 1/405 74/512 |

(Continued)

FOREIGN PATENT DOCUMENTS

| | | |
|---|---|---|
| CN | 201442522 U | 4/2010 |
| DE | 103 06 099 B4 | 8/2004 |

(Continued)

OTHER PUBLICATIONS

Machine translation of DE 10306099 B4 obtained on Oct. 11, 2016.*

(Continued)

*Primary Examiner* — Adam D Rogers
(74) *Attorney, Agent, or Firm* — Oblon, McClelland, Maier & Neustadt, L.L.P.

(57) ABSTRACT

A vehicle pedal including a pedal body that has one longitudinal direction end portion disposed at a vehicle body floor side, and that is supported so as to be capable of pivoting about the one end portion, wherein: a friction regulating section is integrally formed to a tread portion of the pedal body; a first region and a second region are configured on the surface of the friction regulating section, a coefficient of friction of the second region in the longitudinal direction is greater than a coefficient of friction of the first region in the longitudinal direction; the first region configures another end portion side of the tread portion of the pedal body in the longitudinal direction; the second region configures one end portion side of the tread portion in the longitudinal direction.

4 Claims, 7 Drawing Sheets

(56) References Cited

U.S. PATENT DOCUMENTS

| | | | | |
|---|---|---|---|---|
| 7,628,096 | B2* | 12/2009 | Doucet | G05G 1/38 74/560 |
| 7,908,939 | B2* | 3/2011 | Kim | G05G 1/30 74/512 |
| 7,946,192 | B2* | 5/2011 | Kim | B60K 26/02 74/513 |
| 8,997,605 | B2* | 4/2015 | Fuller | G05G 1/44 74/513 |
| 2003/0024344 | A1* | 2/2003 | Liu | G05G 1/483 74/563 |
| 2006/0117902 | A1* | 6/2006 | Martin | G05G 1/38 74/512 |
| 2014/0338492 | A1* | 11/2014 | Yokoi | G05G 1/30 74/513 |
| 2016/0070293 | A1* | 3/2016 | Zhou | F02D 11/02 74/512 |

FOREIGN PATENT DOCUMENTS

| | | |
|---|---|---|
| JP | 58-133828 U | 9/1983 |
| JP | 62-192411 U | 12/1987 |
| JP | 2008-276685 A | 11/2008 |
| JP | 2010-073143 | 4/2010 |
| JP | 2012-113560 | 6/2012 |
| WO | WO 2015133797 A1 * 9/2015 | ......... G06F 3/03541 |

OTHER PUBLICATIONS

Machine translation of JP 58-133828 U obtained on Feb. 28, 2017.*
Extended European Search Report dated Jun. 30, 2016 in Patent Application No. 15192483.4.
Office Action dated Nov. 22, 2016 in Japanese Patent Application No. 2014-224526 (with English translation).

* cited by examiner

VEHICLE PEDAL

CROSS-REFERENCE TO RELATED APPLICATION

This application claims priority under 35 USC 119 from Japanese Patent Application No. 2014-224526 filed on Nov. 4, 2014, the disclosure of which is incorporated by reference herein.

BACKGROUND

Technical Field

An exemplary embodiment of the present invention relates to a vehicle pedal.

Description of the Related Art

German Patent Application Laid-Open No. DE10306099B4 describes an invention relating to a vehicle foot pedal. This vehicle foot pedal is what is referred to as an organ type accelerator pedal in which a pedal body is supported on a vehicle body floor side so as to be capable of pivoting about a base end portion. In this vehicle foot pedal, the coefficient of friction of a rear region (pedal base end portion side) of a tread portion is set greater than the coefficient of friction of a front region (pedal leading end portion side) of the tread portion. This thereby enables frictional force between the foot of the driver and the tread portion to be set at an appropriate magnitude according to the position of the foot of the driver.

SUMMARY OF THE INVENTION

However, in the related technology described above, the front region of the tread portion is configured by the pedal body, while the rear region of the tread portion is configured by a plate configured from rubber or the like with a greater coefficient of friction than the pedal body. Namely, in the related technology described above, it is necessary to configure the tread portion from plural members in order to set the front region and the rear region with different coefficients of friction to each other.

An object of an exemplary embodiment of the present invention is to obtain a vehicle pedal capable of configuring frictional force between a foot of a driver and a tread portion with an appropriate magnitude according to the position of the foot of the driver, and capable of configuring a tread portion from a single member.

A vehicle pedal according to a first aspect of the present invention includes a pedal body that has one longitudinal direction end portion disposed at a vehicle body floor side, and that is supported so as to be capable of pivoting about the one end portion, wherein: a friction regulating section is integrally formed to a tread portion of the pedal body; a first region and a second region are configured on the surface of the friction regulating section, a coefficient of friction of the second region in the longitudinal direction is greater than a coefficient of friction of the first region in the longitudinal direction; the first region configures another end portion side of the tread portion of the pedal body in the longitudinal direction, and that is applied with tread force from a toe side of a foot of a driver; the second region configures one end portion side of the tread portion in the longitudinal direction, and that is applied with tread force from a heel side of the foot.

In this vehicle pedal, the one longitudinal direction end portion of the pedal body is disposed at the vehicle body floor side, and is supported so as to be capable of pivoting about the one end portion. The pedal body pivots when the driver applies tread force to the tread portion of the pedal body. Various operations can accordingly be performed using the vehicle pedal. Moreover, the other end portion side of the tread portion in the pedal body longitudinal direction is configured by the first region that is applied with tread force from the toe side of the foot of the driver, and the one end portion side of the tread portion of the pedal body longitudinal direction is configured by the second region that is applied with tread force from the heel side of the foot of the driver. The first region and the second region are configured on the surface of the friction regulating section, and the coefficient of friction of the second region in the pedal body longitudinal direction is greater than the coefficient of friction of the first region in the pedal body longitudinal direction. Accordingly, greater frictional force in the pedal body longitudinal direction arises between the foot and the vehicle pedal when the driver places their entire foot on the vehicle pedal to operate the vehicle pedal than when the driver only operates the vehicle pedal using the toe side of their foot, with the heel remaining in contact with the vehicle body floor.

Note that if the pedal body and the friction regulating section were respectively configured from different materials in order to set the coefficient of friction of the first region and the coefficient of friction of the second region with different values to each other, it would be necessary to configure the tread portion from plural members.

However, in the present exemplary embodiment, the friction regulating section that is integrally formed to the pedal body sets the coefficient of friction of the first region in the pedal body longitudinal direction and the coefficient of friction of the second region in the pedal body longitudinal direction with different values to each other. This thereby enables the first region and the second region to be set with different coefficients of friction to each other without configuring the tread portion from plural members.

A second aspect is the vehicle pedal according to the first aspect, wherein the friction regulating section is configured including: a first textured portion that is configured with a recessed shape or a protruding shape, and that is formed in the first region so as to have a smaller coefficient of friction in the longitudinal direction than a coefficient of friction in a short direction of the pedal body; and a second textured portion that is configured with a recessed shape or a protruding shape, and that is formed in the second region so as to have a greater coefficient of friction in the longitudinal direction than a coefficient of friction in the short direction.

In this vehicle pedal, the friction regulating section is configured including the first textured portion that is configured with a recessed shape or a protruding shape, and that is formed in the first region, and the second textured portion that is configured with a recessed shape or a protruding shape, and that is formed in the second region. The coefficient of friction of the first region can accordingly be adjusted by modifying the shape of the first textured portion, and the coefficient of friction of the second region can be adjusted by modifying the shape of the second textured portion. The first textured portion is formed so as to have a smaller coefficient of friction in the pedal body longitudinal direction than the coefficient of friction in the pedal body short direction. Accordingly, when the driver presses down the first region side with the toe side of their foot to perform an operation to change the depression amount of the vehicle pedal, the foot moves easily relative to the pedal body in the pedal body longitudinal direction. As a result, the driver can easily adjust the depression amount of the vehicle pedal using the toe side of their foot.

The second textured portion is formed such that the coefficient of friction in the pedal body longitudinal direction is greater than the coefficient of friction in the pedal body short direction. Accordingly, when the driver places the toe side of their foot on the first region side, and places the heel side of their foot on the second region, it is difficult for the foot to move relative to the pedal body in the pedal body longitudinal direction. As a result, when the driver presses down the vehicle pedal with their entire foot to perform an operation to maintain a constant depression amount of the vehicle pedal, the driver can place their foot on the pedal body stably.

A third aspect is the vehicle pedal according to the second aspect, wherein: the first textured portion is configured by plural recesses or protrusions extending along the longitudinal direction and disposed at a predetermined spacing in the short direction; and the second textured portion is configured by plural recesses or protrusions extending along the short direction and disposed at a predetermined spacing in the longitudinal direction.

In this vehicle pedal, the first textured portion is configured by the plural recesses or protrusions extending along the pedal body longitudinal direction and disposed at the predetermined spacing in the pedal body short direction. Accordingly, in cases in which the first textured portion is configured by recesses, in a state in which the driver has placed their foot on the first region, the foot encounters resistance from boundaries between the recesses and the tread portion when the foot attempts to move in the short direction of the pedal body. In cases in which the first textured portion is configured by protrusions, in a state in which the driver has placed their foot on the first region, the foot encounters resistance from the protrusions when the foot attempts to move in the short direction of the pedal body. As a result, in the first region, relative movement between the foot and the vehicle pedal in the short direction of the pedal body is impeded by the first textured portion, and the first textured portion functions to prevent the foot from slipping in the pedal body short direction.

The second textured portion is configured by the plural recesses or protrusions extending along the short direction of the pedal body and disposed at the predetermined spacing in the pedal body longitudinal direction. Accordingly, in cases in which the second textured portion is configured by recesses, in a state in which the driver has placed their foot on the second region, the foot encounters resistance from boundaries between the recesses and the tread portion when the foot attempts to move in the pedal body longitudinal direction. In cases in which the second textured portion is configured by protrusions, in a state in which the driver has placed their foot on the second region, the foot encounters resistance from the protrusions when the foot attempts to move in the pedal body longitudinal direction. As a result, relative movement between the foot and the vehicle pedal in the pedal body longitudinal direction is impeded by the second textured portion in the second region, and the second textured portion functions to prevent the foot from slipping in the pedal body longitudinal direction.

A fourth aspect is the vehicle pedal according to the third aspect, wherein: the first textured portion is configured by plural first recesses; and the second textured portion is configured by plural second recesses, and a width of the second recesses is set narrower than a width of the first recesses.

In this vehicle pedal, the plural first recesses are formed in the first region, and the plural second recesses set with a narrower width than the width of the first recesses are formed in the second region. This thereby enables a small contact surface area with the foot of the driver to be set in the first region, and enables a large contact surface area with the foot of the driver to be set in the second region.

A fifth aspect is the vehicle pedal according to the fourth aspect, wherein the width of the second recesses is set as a shorter length than the spacing between the second recesses.

In this vehicle pedal, the width of the second recesses is set as a shorter length than the spacing between the second recesses. This thereby enables a larger contact surface area with the foot of the driver to be set in the second region.

A sixth aspect is the vehicle pedal according to either the fourth aspect or the fifth aspect, wherein: when the second recess is viewed in cross-section along the short direction, the other end portion side of the second recess configures a corner portion, and the one end portion side of the second recess configures an oblique portion with a depth from the tread portion becoming shallower on progression toward the one end portion side.

In this vehicle pedal, the pedal body other end portion side of the second recess configures the corner portion. Accordingly, in the second region, the corner portion resists the foot of the driver, and the foot is suppressed from moving toward the pedal body other end portion side relative to the tread portion. The pedal body one end portion side of the second recess configures the oblique portion with a depth from the tread portion becoming shallower on progression toward the one end portion side. Water and the like that has entered the second recess accordingly runs out toward the one end portion side of the pedal body.

A seventh aspect is the vehicle pedal according of any one of the fourth aspect to the sixth aspect, wherein: when the first recess is viewed in cross-section along the short direction, the one end portion side of the first recess configures an oblique portion with a depth from the tread portion becoming shallower on progression toward the one end portion side.

In this vehicle pedal, the pedal body one end portion side of the first recess configures the oblique portion with a depth from the tread portion becoming shallower on progression toward the one end portion side. Water and the like that has entered the first recess accordingly runs out toward the one end portion side of the pedal body.

Advantageous Effects of Invention

As described above, the vehicle pedal according to the first aspect of the present invention exhibits the excellent advantageous effects of enabling frictional force between the foot of the driver and the tread portion to be configured with an appropriate magnitude according to the position of the foot of the driver, and enabling the tread portion to be configured from a single member.

The vehicle pedal according to the second aspect exhibits the excellent advantageous effect of enabling comfort to be secured in an operation to vary a depression amount, and enables stability to be secured in an operation to maintain a constant depression amount.

The vehicle pedal according to the third aspect exhibits the excellent advantageous effect of bearing tread force from the driver with the foot of the driver in a stable state.

The vehicle pedal according to the fourth aspect exhibits the excellent advantageous effects of enabling sliding to be made easier when the driver performs an operation with the toe side of their foot, and enabling slipping to be discouraged when the driver uses their entire foot, including the heel area, to operate the vehicle pedal.

The vehicle pedal according to the fifth aspect exhibits the excellent advantageous effect of enabling slipping to be made even more difficult when the driver uses their entire foot, including the heel area, to operate the vehicle pedal.

The vehicle pedal according to the sixth aspect exhibits the excellent advantageous effect of enabling easier cleaning, while securing frictional force between the foot and the tread portion, in the second region that is applied with tread force from the heel side of the foot of the driver.

The vehicle pedal according to the seventh aspect exhibits the excellent advantageous effect of enabling easier cleaning in the first region that is applied with tread force from the toe side of the foot of the driver.

DETAILED DESCRIPTION OF PREFERRED EMBODIMENTS

First Exemplary Embodiment

Explanation follows regarding an accelerator pedal device 10 including a vehicle pedal according to a first exemplary embodiment of the present invention, with reference to FIG. 1 to FIG. 5. In the drawings, the arrow FR indicates the vehicle front side, the arrow UP indicates the vehicle upper side, and the arrow OUT indicates the vehicle width direction outside, as appropriate.

Figure 5:
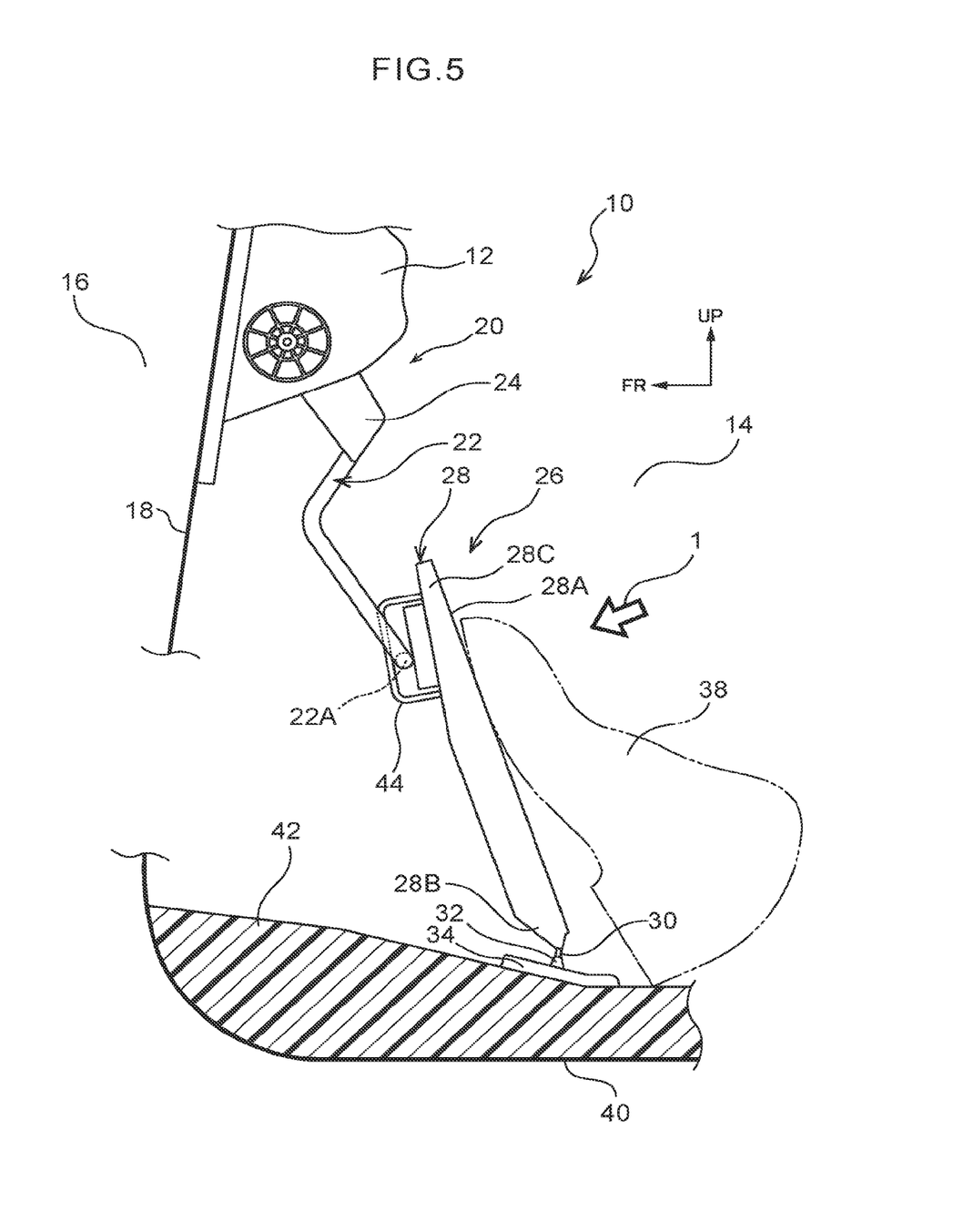
FIG. 5 is a side view illustrating a configuration of an accelerator pedal device according to the present exemplary embodiment.

Explanation first follows regarding an overall configuration of the accelerator pedal device 10, with reference to FIG. 5. The accelerator pedal device 10 is configured including housing 12, a pedal arm 20, and an accelerator pedal 26, serving as a vehicle pedal.

The housing 12 is formed in a box shape, and is installed to a dash panel 18 that partitions between a cabin 14 and a power unit chamber 16. An opening, not illustrated in the drawings, is formed at a vehicle lower side of the housing 12. The pedal arm 20 is attached inside the housing 12.

The pedal arm 20 is configured including a link portion 22 that is formed by bending round bar shaped steel material or the like, and a block shaped base end portion 24. The base end portion 24 is inserted through the opening of the housing 12 and attached to the housing 12 using a pedal boss, not illustrated in the drawings, thereby supporting the pedal arm 20 on the housing 12 so as to be capable of swinging. A leading end portion 22A on the opposite side of the link portion 22 to the base end portion 24 is anchored to a bracket 44 attached to the accelerator pedal 26, as described later.

Figure 1:
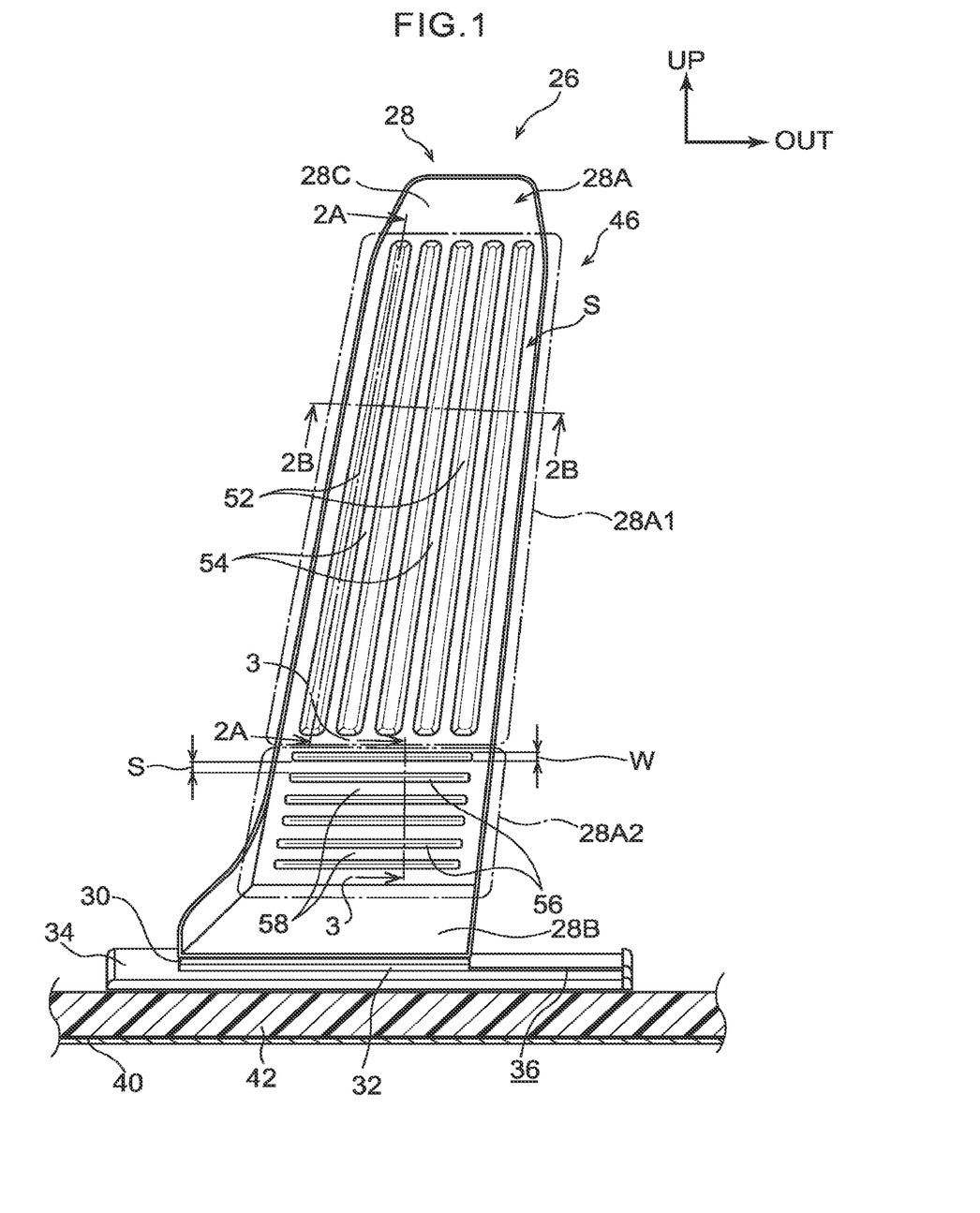
FIG. 1 is a front view (viewed along the direction of arrow 1 in FIG. 5) illustrating a configuration of a vehicle pedal according to a first exemplary embodiment.

The accelerator pedal 26 is, for example, configured from a resin material with resilient properties, and includes a pedal body 28, an integral hinge 30, and an insertion portion 32. As also illustrated in FIG. 1, the pedal body 28 includes a tread portion 28A that is formed in a substantially rectangular flat plate shape that narrows at a leading end side, that is applied with tread force from a foot 38 of the driver, and that is disposed with its plate thickness direction substantially in the vehicle front-rear direction and with its longitudinal direction substantially along the vehicle vertical direction. One end portion (a base end portion) 28B on the vehicle lower side of the pedal body 28 is provided with the integral hinge 30 that runs along the one end portion 28B, and the insertion portion 32 that is formed on the other side of the integral hinge 30. The insertion portion 32 extends along the short direction of the pedal body 28, similarly to the integral hinge 30. The length of the insertion portion 32 is set longer than the length of the integral hinge 30 by a predetermined length, and part of the insertion portion 32 extends out from the one end portion 28B of the pedal body 28 toward the vehicle width direction outside.

A pedal support 34, formed in a rectangular plate shape in plan view, is disposed at a vehicle lower side of the accelerator pedal 26, with its plate thickness direction along the vehicle vertical direction. The pedal support 34 is formed with an inserted-into portion 36, into which the insertion portion 32 of the accelerator pedal 26 can be inserted, and the insertion portion 32 is inserted into the inserted-into portion 36. The pedal support 34 is disposed at the vehicle upper side of a tibia pad 42 laid on a vehicle body floor 40, and is attached to an accelerator pedal bracket disposed inside a penetrated portion, not illustrated in the drawings, formed to the tibia pad 42, by an attachment means that is not illustrated in the drawings. The pedal body 28 is accordingly supported on the vehicle body floor 40 so as to be capable of pivoting about the longitudinal direction one end portion 28B (integral hinge 30). Namely, the accelerator pedal 26 of the present exemplary embodiment is configured as what is referred to as an organ type accelerator pedal.

As mentioned above, the bracket 44 is disposed at a back face side (a vehicle front side face side) of the pedal body 28. The bracket 44 is formed in a C-shape opening toward the pedal body 28 side as viewed along the vehicle width direction, and in a rectangular shape with its longitudinal direction along the longitudinal direction of the pedal body 28 as viewed from the vehicle front side. Respective leading end portions of the bracket 44 are formed with anchor portions, not illustrated in the drawings, and the anchor portions are anchored to anchored-to portions, not illustrated in the drawings, provided to the pedal body 28, thereby attaching the bracket 44 to the pedal body 28. The leading end portion 22A of the link portion 22 configuring the pedal arm 20 is inserted between the pedal body 28 and the bracket 44. Accordingly, the pedal arm 20 swings with respect to the housing 12 accompanying the action of the accelerator pedal 26 pivoting about the integral hinge 30.

A return spring, not illustrated in the drawings, is disposed inside the housing 12, and the return spring biases the pedal arm 20 in a counterclockwise direction about the axial center of the pedal boss. Accordingly, when an occupant applies tread force to the accelerator pedal 26, the accelerator pedal 26 swings against the biasing force of the return spring, and the accelerator pedal 26 returns to its original position under the biasing force of the return spring when the tread force ceases to be applied.

In the present exemplary embodiment, the tread portion 28A of the pedal body 28 is provided with a friction regulating section 46 including first recesses 52 serving as a first textured portion, and second recesses 56 serving as a second textured portion. Plural of the first recesses 52 are formed in a first region 28A1 of the tread portion 28A of the pedal body 28, configuring another end portion (leading end portion) 28C side of the pedal body 28. Plural of the second recesses 56 are formed in a second region 28A2 of the tread portion 28A, configuring the one end portion 28B side of the pedal body 28, on the vehicle lower side. Namely, in the present exemplary embodiment, the first recesses 52 and the second recesses 56 configure part of a surface pattern of the first region 28A1 and the second region 28A2. Detailed explanation follows regarding configuration of the first recesses 52 formed in the first region 28A1 and the second recesses 56 formed in the second region 28A2.

Figure 4A:
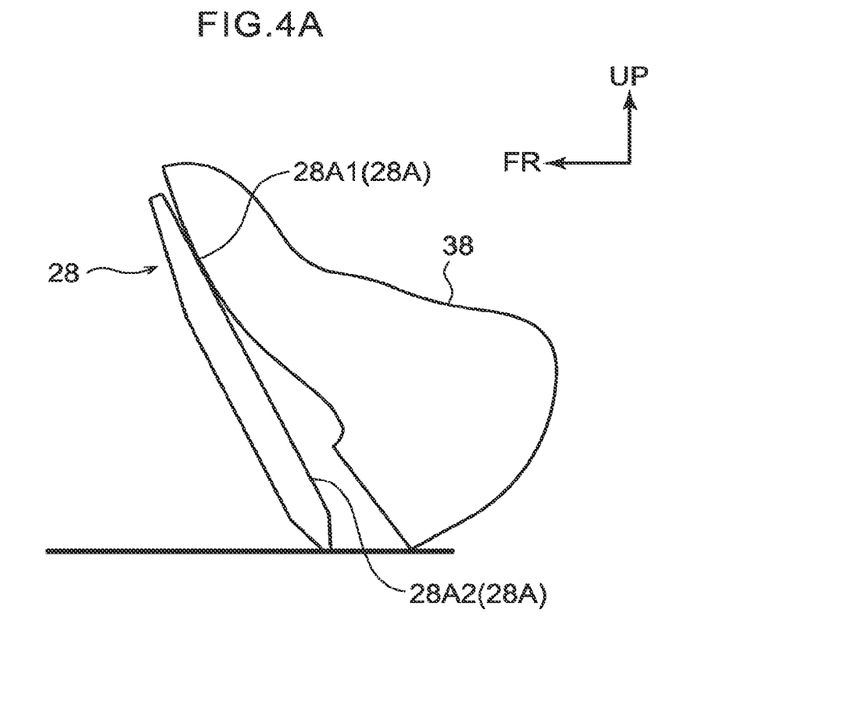
FIG. 4A is a schematic view illustrating a state in which a driver presses down a vehicle pedal with the toe side of their foot in the first exemplary embodiment.
Figure 4B:
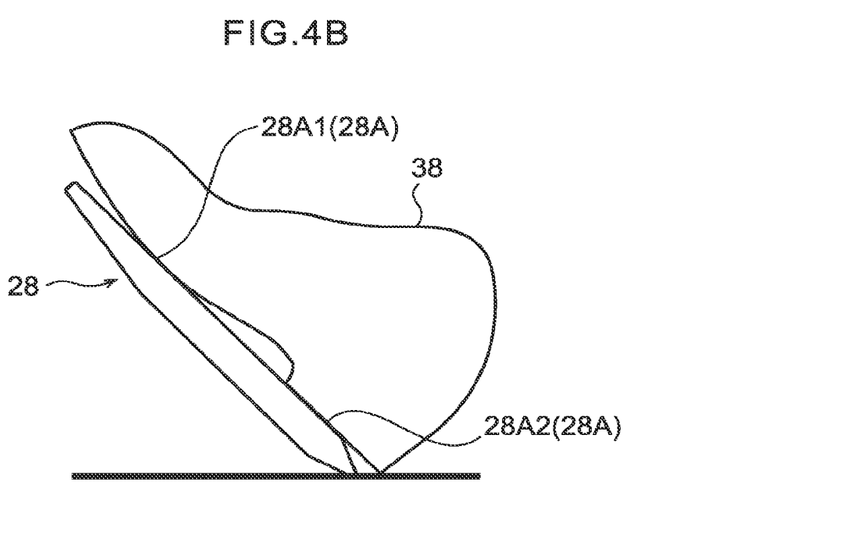
FIG. 4B is a schematic view illustrating a state in which a driver presses down a vehicle pedal with their entire foot in the first exemplary embodiment.

As illustrated in FIG. 1, when the tread portion 28A has a surface area S, the first region 28A1 is configured across a range from 0.8 S from the leading end of the pedal body 28, excluding a range of 0.1 S at the narrowed leading end portion of the pedal body 28. Note that as illustrated in FIG. 4, the first region 28A1 is a portion contacted by a toe side of the foot 38 of the driver when the driver presses down the accelerator pedal 26. The first region 28A1 may therefore be defined as a region of the tread portion 28A applied with tread force from the toe side of the foot 38 of the driver.

As an example, five of the first recesses 52 formed in the first region 28A1 are provided across the short direction of the pedal body 28, and extend with their longitudinal direction along the longitudinal direction of the pedal body 28. The first recesses 52 are quadrilateral, with the four corners rounded into circular arc shapes as viewed face-on. More specifically, each of the first recesses 52 forms a trapezoidal shape, gradually narrowing on progression from the one end portion 28B side toward the other end portion 28C side of the pedal body 28. The tread portion 28A also forms a trapezoidal shape, gradually narrowing on progression from the one end portion 28B side to the other end portion 28C side of the pedal body 28. Accordingly, the spacing between the first recesses 52 also gradually narrows on progression from the one end portion 28B side toward the other end portion 28C side of the pedal body 28 so as to conform to the shapes of the first recesses 52 and the tread portion 28A. In other words, first ribs 54 that gradually narrow on progression from the one end portion 28B side toward the other end portion 28C side of the pedal body 28 are formed between the first recesses 52. Namely, the first region 28A1 may be understood as being configured with a textured face by the first recesses 52 and the first ribs 54.

Figure 2A:
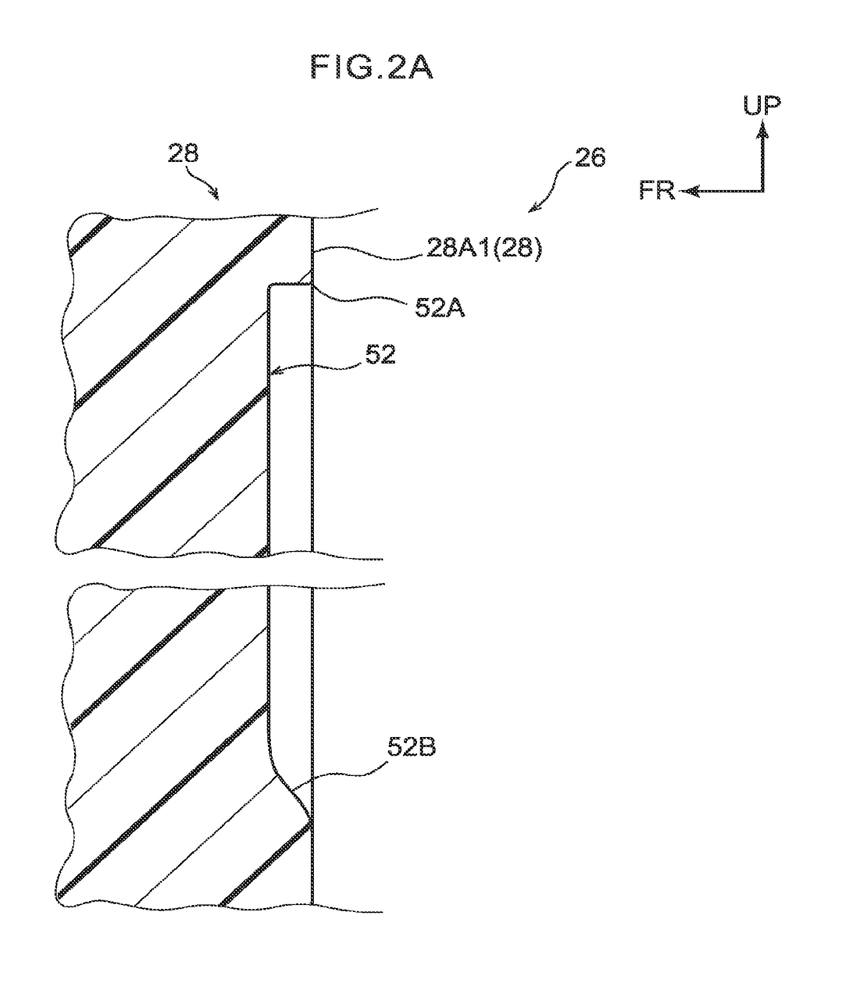
FIG. 2A is an enlarged cross-section viewed along a short direction of a vehicle pedal (a cross-section illustrating a state taken along line 2A-2A in FIG. 1), illustrating a first recess according to the first exemplary embodiment.
Figure 2B:
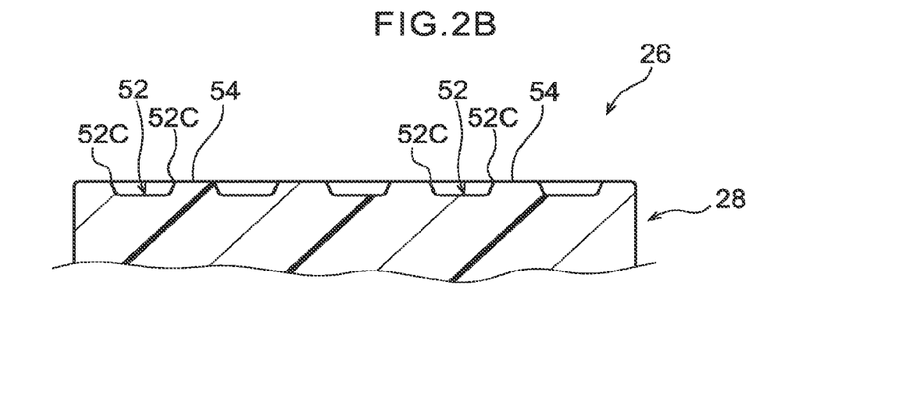
FIG. 2B is an enlarged cross-section viewed along a longitudinal direction of a vehicle pedal (a cross-section illustrating a state taken along line 2B-2B in FIG. 1), illustrating first recesses according to the first exemplary embodiment.

As illustrated in FIG. 2A, as viewed in cross-section along the short direction of the pedal body 28, each of the first recesses 52 has a corner portion 52A on the other end portion 28C side of the pedal body 28, and an oblique portion 52B on the one end portion 28B side of the pedal body 28. The oblique portion 52B is formed so as to become shallower in depth from the tread portion 28A on progression toward the one end portion 28B side of the pedal body 28. As illustrated in FIG. 2B, as viewed in cross-section along the longitudinal direction of the pedal body 28, each of the first recesses 52 has corner portions 52C at portions on both pedal body 28 short direction sides, namely at boundaries between the first recesses 52 and the tread portion 28A.

Due to forming the first recesses 52 configured as described above in the first region 28A1, in the first region 28A1, a coefficient of friction in the longitudinal direction of the pedal body 28 is less than a coefficient of friction in the short direction of the pedal body 28. More specifically, forming the plural first recesses 52 in the first region 28A1 reduces the contact surface area between the first region 28A1 and the foot 38 of the driver. Accordingly, in a state in which the driver has placed their foot 38 on the first region 28A1, the coefficient of friction is reduced when the foot 38 moves relative to the pedal body 28 in the longitudinal direction of the pedal body 28.

When the foot 38 attempts to move relative to the first region 28A1 in the short direction of the pedal body 28 in a state in which the driver has placed their foot 38 on the first region 28A1, the corner portions 52C are pressed by the foot 38, and the first ribs 54 undergo resilient deformation. Recovery force of the first ribs 54 resists the foot 38, such that the foot 38 does not readily slip in the short direction of the pedal body 28. Accordingly, in a state in which the driver has placed their foot 38 on the first region 28A1, the coefficient of friction is increased when the foot 38 moves relative to the pedal body 28 in the short direction of the pedal body 28.

As illustrated in FIG. 1, the second region 28A2 is configured across a range of the tread portion 28A excluding the first region 28A1, namely across a range of the tread portion 28A of 0.2 S from the one end portion 28B side of the pedal body 28. Note that as illustrated in FIG. 4, the second region 28A2 is a portion contacted by a heel side of the foot 38 of the driver when the driver presses down the accelerator pedal 26. The second region 28A2 may accordingly also be defined as a region of the tread portion 28A that is applied with tread force from the heel side of the foot 38 of the driver.

As an example, six of the second recesses 56 formed in the second region 28A2 are provided at a predetermined spacing D in the longitudinal direction of the pedal body 28, and extend with their longitudinal direction along the short direction of the pedal body 28. The second recesses 56 are rectangular, with the four corners rounded into circular arc shapes as viewed face-on, and a width W (length in the longitudinal direction of the pedal body 28) is set as a shorter length than the spacing D between the second recesses 56. In other words, similarly to in the first region 28A1, in the second region 28A2, second ribs 58 are formed between the second recesses 56. Namely, the second region 28A2 may be understood as being configured with a textured face by the second recesses 56 and the second ribs 58. Note that the width W of the second recesses 56 is set as a shorter length than a width (length in the short direction of the pedal body 28) of the first recesses 52. In other words, the width of the second recesses 56 is narrower than the width of the first recesses 52. The second region 28A2 accordingly has a larger contact surface area with the foot 38 than the first region 28A1 per unit surface area.

Figure 3:
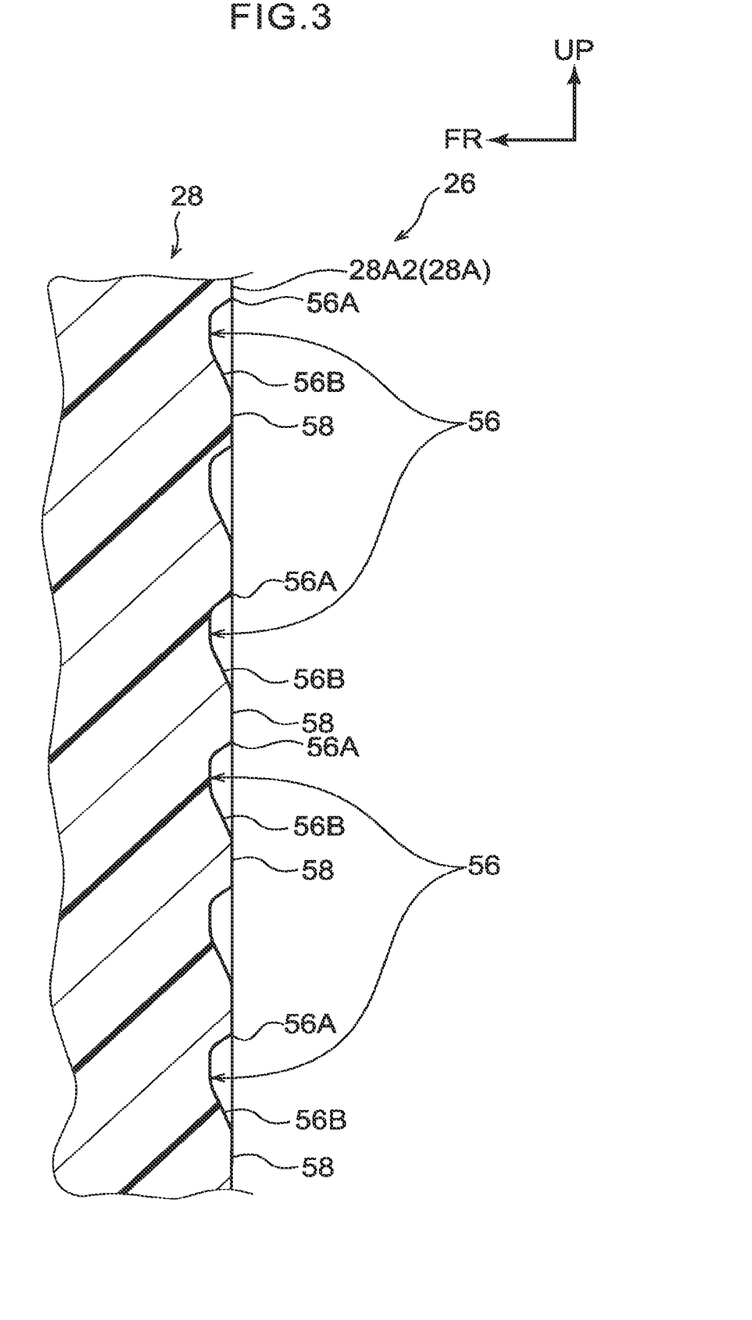
FIG. 3 is an enlarged cross-section viewed along a short direction of a vehicle pedal (a cross-section illustrating a state taken along line 3-3 in FIG. 1), illustrating second recesses according to the first exemplary embodiment.

As illustrated in FIG. 3, as viewed in cross-section along the short direction of the pedal body 28, each of the second recesses 56 has a corner portion 56A at a boundary with the tread portion 28A on the other end portion 28C side of the pedal body 28, and an oblique portion 56B on the one end portion 28B side of the pedal body 28. Although the corner portion 56A is formed with an obtuse angle profile overall, a leading end portion thereof is rounded into a circular arc shape with a small diameter. The oblique portion 56B is formed so as to become gradually shallower in depth from the tread portion 28A on progression toward the one end portion 28B side of the pedal body 28.

Due to forming the second recesses 56 configured as described above in the second region 28A2, in the second region 28A2 a coefficient of friction in the short direction of the pedal body 28 is less than a coefficient of friction in the longitudinal direction of the pedal body 28. More specifically, when the foot 38 attempts to move relative to the second region 28A2 in the longitudinal direction of the pedal body 28 in a state in which the driver has placed their foot 38 on the second region 28A2, the corner portions 56A are pressed by the foot 38, and the second ribs 58 undergo resilient deformation. Recovery force of the second ribs 58 resists the foot 38, such that the foot 38 does not readily slip in the longitudinal direction of the pedal body 28. Accordingly, in a state in which the driver has placed their foot 38 on the second region 28A2, the coefficient of friction is increased when the foot 38 moves relative to the pedal body 28 in the longitudinal direction of the pedal body 28.

When the friction regulating section 46 configured including the first recesses 52 and the second recesses 56 is considered as a whole, the coefficient of friction in the longitudinal direction of the pedal body 28 in the second region 28A2 has a higher value than the coefficient of friction in the longitudinal direction of the pedal body 28 in the first region 28A1. Namely, in the present exemplary embodiment, the friction regulating section 46 configured including the first recesses 52 and the second recesses 56 regulates the coefficient of friction of the first region 28A1 and the second region 28A2.

Operation and Advantageous Effects of the Present Exemplary Embodiment

Next, explanation follows regarding operation and advantageous effects of the present exemplary embodiment.

In the present exemplary embodiment, in the pedal body 28 configuring the accelerator pedal 26, the one end portion 28B in the longitudinal direction is set on the vehicle body floor 40 side, and the pedal body 28 is supported so as to be capable of pivoting about the one end portion 28B. The pedal body 28 pivots when the driver applies tread force to the tread portion 28A of the pedal body 28. Various operations can accordingly be performed using the accelerator pedal 26. The other end portion 28C side of the tread portion 28A in the longitudinal direction of the pedal body 28 is moreover configured with the first region 28A1 that is applied with tread force from the toe side of the foot 38 of the driver. The one end portion 28B side of the tread portion 28A in the longitudinal direction of the pedal body 28 is configured with the second region 28A2 that is applied with tread force from the heel side of the foot 38 of the driver.

When the driver operates the accelerator pedal 26, as illustrated in FIG. 4A, in a first scenario, it is conceivable that only the toe side of the foot 38 operates the accelerator pedal 26, with the heel remaining in contact with the vehicle body floor 40. As illustrated in FIG. 4B, in a second scenario, it is conceivable that the driver places their entire foot 38 on the accelerator pedal 26 to operate the accelerator pedal 26. In the present exemplary embodiment, part of the surface pattern of the first region 28A1 and the second region 28A2 is configured by the friction regulating section 46. Moreover, the coefficient of friction of the second region 28A2 in the longitudinal direction of the pedal body 28 is set greater than the coefficient of friction of the first region 28A1 in the longitudinal direction of the pedal body 28 due to the friction regulating section 46. Accordingly, greater frictional force arises between the foot 38 and the accelerator pedal 26 in the longitudinal direction of the pedal body 28 in the second scenario than in the first scenario.

Note that if the pedal body 28 and the friction regulating section 46 were configured from different materials in order to set the coefficient of friction of the first region 28A1 and the coefficient of friction of the second region 28A2 with different values to each other, it would be necessary to configure the tread portion 28A from plural members.

However, in the present exemplary embodiment, the friction regulating section 46 that is integrally formed to the pedal body 28 sets the coefficient of friction of the first region 28A1 in the longitudinal direction of the pedal body 28 and the coefficient of friction of the second region 28A2 in the longitudinal direction of the pedal body 28 with different values to each other. This thereby enables the first region 28A1 and the second region 28A2 to be set with different coefficients of friction to each other without configuring the tread portion 28A from plural members. As a result, the present exemplary embodiment enables the frictional force between the foot 38 of the driver and the tread portion 28A to be set to an appropriate magnitude according to the position of the foot 38 of the driver, and enables the tread portion 28A to be configured from a single member.

In a case in which the pedal body 28 and the friction regulating section 46 were configured from plural members respectively using different materials, it would be necessary to provide gaps between the respective members in consideration of, for example, the linear expansion coefficients of the respective members. As a result, it is conceivable that it may not be possible to achieve frictional force of an appropriate magnitude between the foot 38 and the tread portion 28A when pebbles or the like caught in the gaps between the respective members contact the foot 38 of the driver. However, in the present exemplary embodiment, the friction regulating section 46 is integrally formed to the pedal body 28 as described above, thereby enabling frictional force of an appropriate magnitude between the foot 38 of the driver and the tread portion 28A.

In the present exemplary embodiment, the friction regulating section 46 is configured including the recess shaped first recesses 52 formed in the first region 28A1, and the recess shaped second recesses 56 formed in the second region 28A2. The coefficient of friction of the first region can accordingly be adjusted by modifying the shape of the first recesses 52, and the coefficient of friction of the second region can be adjusted by modifying the shape of the second recesses 56. The first recesses 52 are formed such that the coefficient of friction in the longitudinal direction of the pedal body 28 is less than the coefficient of friction in the short direction of the pedal body 28. Accordingly in the first scenario, when the driver performs an operation to change the depression amount of the accelerator pedal 26, the foot 38 moves easily relative to the pedal body 28 in the longitudinal direction of the pedal body 28. As a result, the driver can easily adjust the depression amount of the accelerator pedal 26 using the toe side of their foot 38.

The second recesses 56 are formed such that the coefficient of friction in the longitudinal direction of the pedal body 28 is greater than the coefficient of friction in the short direction of the pedal body 28. Accordingly, in the second scenario, the foot 38 of the driver does not move easily relative to the pedal body 28 in the longitudinal direction of the pedal body 28. As a result, in the second scenario, when the driver performs an operation to maintain a constant depression amount of the accelerator pedal 26, the driver can place their foot 38 on the pedal body 28 stably. Accordingly, the present exemplary embodiment enables comfort to be secured in an operation to vary the depression amount, and enables stability to be secured in an operation to maintain a constant depression amount.

In the present exemplary embodiment, the first recesses 52 extend along the longitudinal direction of the pedal body 28, and plural of the first recesses 52 are disposed at a predetermined spacing in the short direction of the pedal body 28. Accordingly, in a state in which the driver has placed their foot 38 on the first region 28A1, the foot 38 encounters resistance from the boundaries between the first recesses 52 and the tread portion 28A when the foot 38 attempts to move in the short direction of the pedal body 28. Relative movement between the foot 38 of the driver and the accelerator pedal 26 in the short direction of the pedal body 28 is thus impeded. Namely, the first recesses 52 of the first region 28A1 function to prevent the foot 38 of the driver from slipping in the short direction of the pedal body 28.

The second recesses 56 extend along the short direction of the pedal body 28, and plural of the second recesses 56 are disposed at the predetermined spacing D in the longitudinal direction of the pedal body 28. Accordingly, in a state in which the foot 38 of the driver has been placed on the second region 28A2, the foot 38 encounters resistance from the boundaries between the second recesses 56 and the tread portion 28A when the foot 38 attempts to move in the longitudinal direction of the pedal body 28. Relative movement between the foot 38 and the accelerator pedal 26 in the longitudinal direction of the pedal body 28 is thus impeded. Namely, the second recesses 56 of the second region 28A2 function to prevent the foot 38 of the driver from slipping in the longitudinal direction of the pedal body 28. Accordingly, in the present exemplary embodiment, the accelerator pedal 26 can bear tread force from the driver with the foot 38 of the driver in a stable state.

Moreover, in the present exemplary embodiment, the width of each of the plural second recesses 56 formed in the second region 28A2 is set narrower than the width of each of the plural first recesses 52 formed in the first region 28A1. The contact surface area with the foot 38 of the driver can accordingly be set smaller in the first region 28A1, and the contact surface area with the foot 38 of the driver can be set larger in the second region 28A2. Accordingly in the present exemplary embodiment, sliding can be made easier when the driver performs an operation with the toe side of their foot 38, and slipping can be discouraged when the driver uses their entire foot 38, including the heel area, to operate the vehicle pedal.

Moreover, in the present exemplary embodiment, the width W of the second recesses 56 is set with a shorter length than the spacing D between the second recesses 56, thereby enabling a larger contact surface area with the foot 38 of the driver to be set in the second region 28A2. Accordingly, in the present exemplary embodiment, slipping can be made even more difficult when the driver uses their entire foot 38, including the heel area, to operate the accelerator pedal 26.

Furthermore, in the present exemplary embodiment, the corner portions 56A of the second recesses 56 are configured at the other end portion 28C side of the pedal body 28. The corner portions 56A accordingly resist the foot 38 of the driver in the second region 28A2, suppressing relative movement of the foot 38 toward the other end portion 28C side of the pedal body 28 with respect to the tread portion 28A. In the second recesses 56, the oblique portions 56B with a depth from the tread portion 28A becoming shallower on progression toward the one end portion 28B side are configured on the one end portion 28B side of the pedal body 28, such that water or the like that has entered the second recesses 56 runs out toward the one end portion 28B side of the pedal body 28. As a result, the present exemplary embodiment enables easier cleaning, while securing frictional force between the foot 38 and the tread portion 28A in the second region 28A2 that is applied with tread force from the heel side of the foot 38 of the driver.

Moreover, in the present exemplary embodiment, in the first recesses 52, the oblique portions 52B with a depth from the tread portion 28A becoming shallower on progression toward the one end portion 28B side are configured on the one end portion 28B side of the pedal body 28. Accordingly, water or the like that has entered the first recesses 52 runs out toward the one end portion 28B side of the pedal body 28. This thereby enables easier cleaning of the first region 28A1 that is applied with tread force from the toe side of the foot 38 of the driver.

Second Exemplary Embodiment

Next, explanation follows regarding configuration of a vehicle pedal according to a second exemplary embodiment of the present invention. Configuration portions similar to those of the first exemplary embodiment described above are allocated the same reference numerals, and explanation thereof is omitted. Note that FIG. 6 omits illustration of portions of an accelerator pedal 70 according to the present exemplary embodiment other than a pedal body 28.

Figure 6:
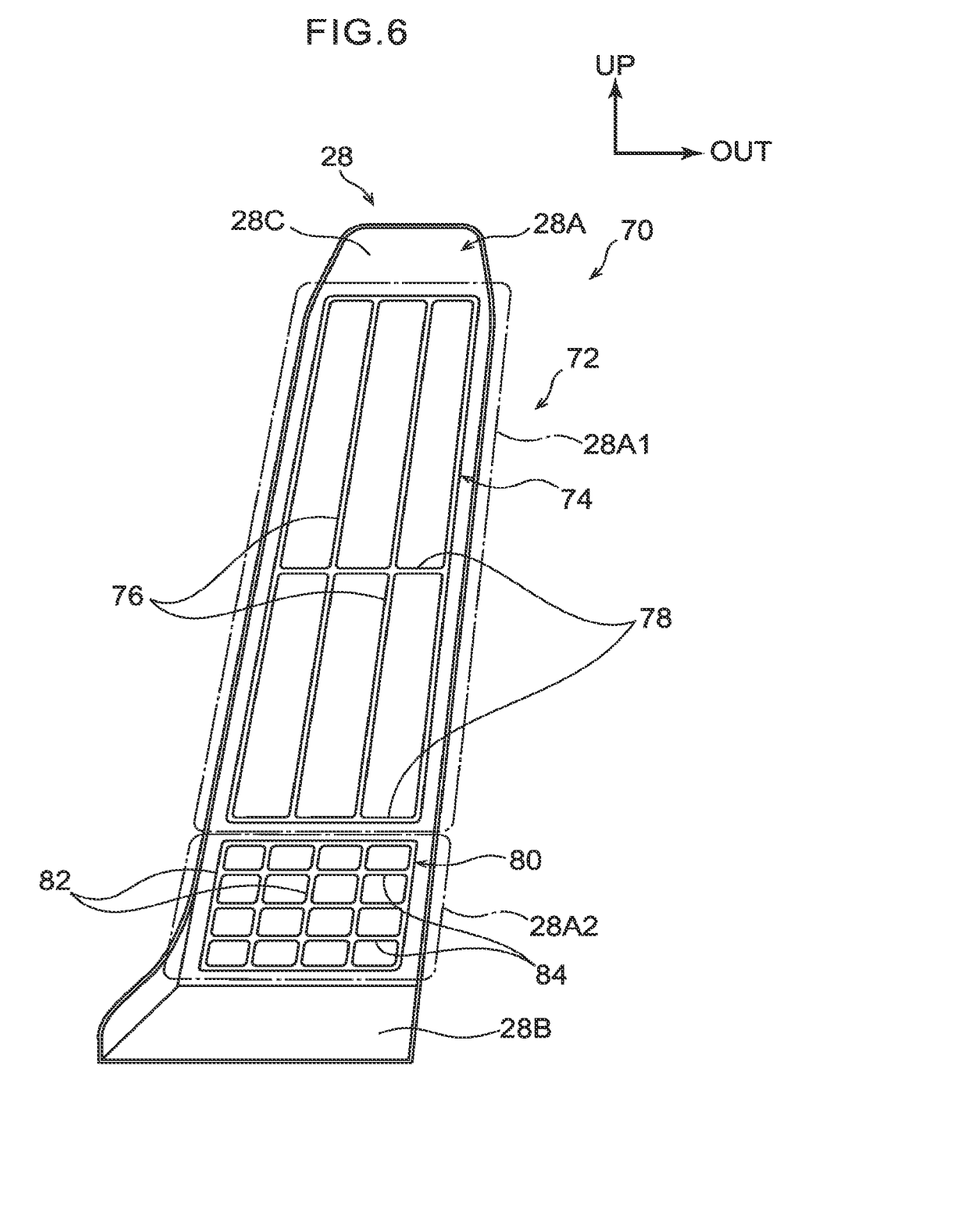
FIG. 6 is a front view (viewed along the direction of arrow 1 in FIG. 5) illustrating a configuration of a vehicle pedal according to a second exemplary embodiment.

The second exemplary embodiment differs from the first exemplary embodiment described above in the point that, as a friction regulating section 72, protrusions are formed in a lattice pattern in a first region 28A1 and a second region 28A2 configuring a tread portion 28A of the accelerator pedal 70. Namely, the first region 28A1 is formed with a first latticed protrusion section 74 that configures a lattice pattern as viewed face-on, and the second region 28A2 is formed with a second latticed protrusion section 80 that configures a lattice pattern as viewed face-on, similarly to the first latticed protrusion section 74.

More specifically, the first latticed protrusion section 74 formed to the first region 28A1 is configured including first longitudinal direction protrusions 76 extending along the longitudinal direction of the pedal body 28, and first short direction protrusions 78 extending along the short direction of the pedal body 28. Four of the first longitudinal direction protrusions 76 are formed in rectangular block shapes, at a predetermined spacing in the short direction of the pedal body 28. Three of the first short direction protrusions 78 are formed in rectangular block shapes similarly to the first longitudinal direction protrusions 76, at a predetermined spacing in the longitudinal direction of the pedal body 28. More specifically, the first short direction protrusions 78 are disposed at both longitudinal direction end portions of the first longitudinal direction protrusions 76 and at longitudinal direction central portions of the first longitudinal direction protrusions 76. The first short direction protrusions 78 couple together the end portions of the first longitudinal direction protrusions 76 on the one end portion 28B side of the pedal body 28, the end portions of the first longitudinal direction protrusions 76 on the other end portion 28C side of the pedal body 28, and the central portions of the first longitudinal direction protrusions 76.

The second latticed protrusion section 80 formed to the second region 28A2 is configured including second longitudinal direction protrusions 82 extending along the longitudinal direction of the of the pedal body 28, and second short direction protrusions 84 extending along the short direction of the pedal body 28. Although the second latticed protrusion section 80 has basically the same configuration as the first latticed protrusion section 74 described above, they differ in the following points. Namely, in the second lattice protrusion section 80, five of the second longitudinal direction protrusions 82 are formed at a predetermined spacing in the short direction the pedal body 28, and five of the second short direction protrusions 84 are formed so as to divide the respective second longitudinal direction protrusions 82 into four equal parts along the longitudinal direction of the pedal body 28. The length of the second short direction protrusions 84 is set similarly to the length of the first short direction protrusions 78; however, the length of the second longitudinal direction protrusions 82 is set shorter than the length of the first longitudinal direction protrusions 76 (as an example, to approximately 20% of the length of the first longitudinal direction protrusions 76). Namely, the second latticed protrusion section 80 is formed with a finer lattice than the first latticed protrusion section 74. Note that the number of the first longitudinal direction protrusions 76, the first short direction protrusions 78, the second longitudinal direction protrusions 82, and the second short direction protrusions 84 may be modified as appropriate, as long as the second latticed protrusion section 80 is formed with a finer lattice than the first latticed protrusion section 74.

In the accelerator pedal 70 configured as described above, in a state in which the driver has placed their foot 38 on the first region 28A1, recovery force of the first latticed protrusion section 74 that has been pressed by the foot 38 and undergone resilient deformation resists the foot 38 when the foot 38 attempts to move relative to the first region 28A1. In a state in which the driver has placed their foot 38 on the second region 28A2, recovery force of the second latticed protrusion section 80 that has been pressed by the foot 38 and undergone resilient deformation resists the foot 38 when the foot 38 attempts to move relative to the second region 28A2. Moreover, as described above, the second latticed protrusion section 80 is formed with a finer lattice than the first latticed protrusion section 74. The coefficient of friction of the second latticed protrusion section 80 is accordingly greater than the coefficient of friction of the first latticed protrusion section 74 in both the longitudinal direction of the pedal body 28 and the short direction of the pedal body 28. The present exemplary embodiment accordingly exhibits similar operation and advantageous effects to the first exemplary embodiment described above, with the exception of operation and advantageous effects due to the friction regulating section 46 being configured including recesses.

In the present exemplary embodiment, the first latticed protrusion section 74 is configured including the first short direction protrusions 78. The first region 28A1 is accordingly formed with a large coefficient of friction in the longitudinal direction of the pedal body 28 due to forming the first latticed protrusion section 74 in the first region 28A1. Moreover, the second latticed protrusion section 80 is configured including the second longitudinal direction protrusions 82. The second region 28A2 is accordingly also formed with a large coefficient of friction in the short direction of the pedal body 28 due to forming the second lattice protrusion section 80 in the second region 28A2. Accordingly, in the present exemplary embodiment, the coefficients of friction in the longitudinal direction of the pedal body 28 and in the short direction of the pedal body 28 can be set with appropriate values in the first region 28A1 and the second region 28A2.

Third Exemplary Embodiment

Figure 7:
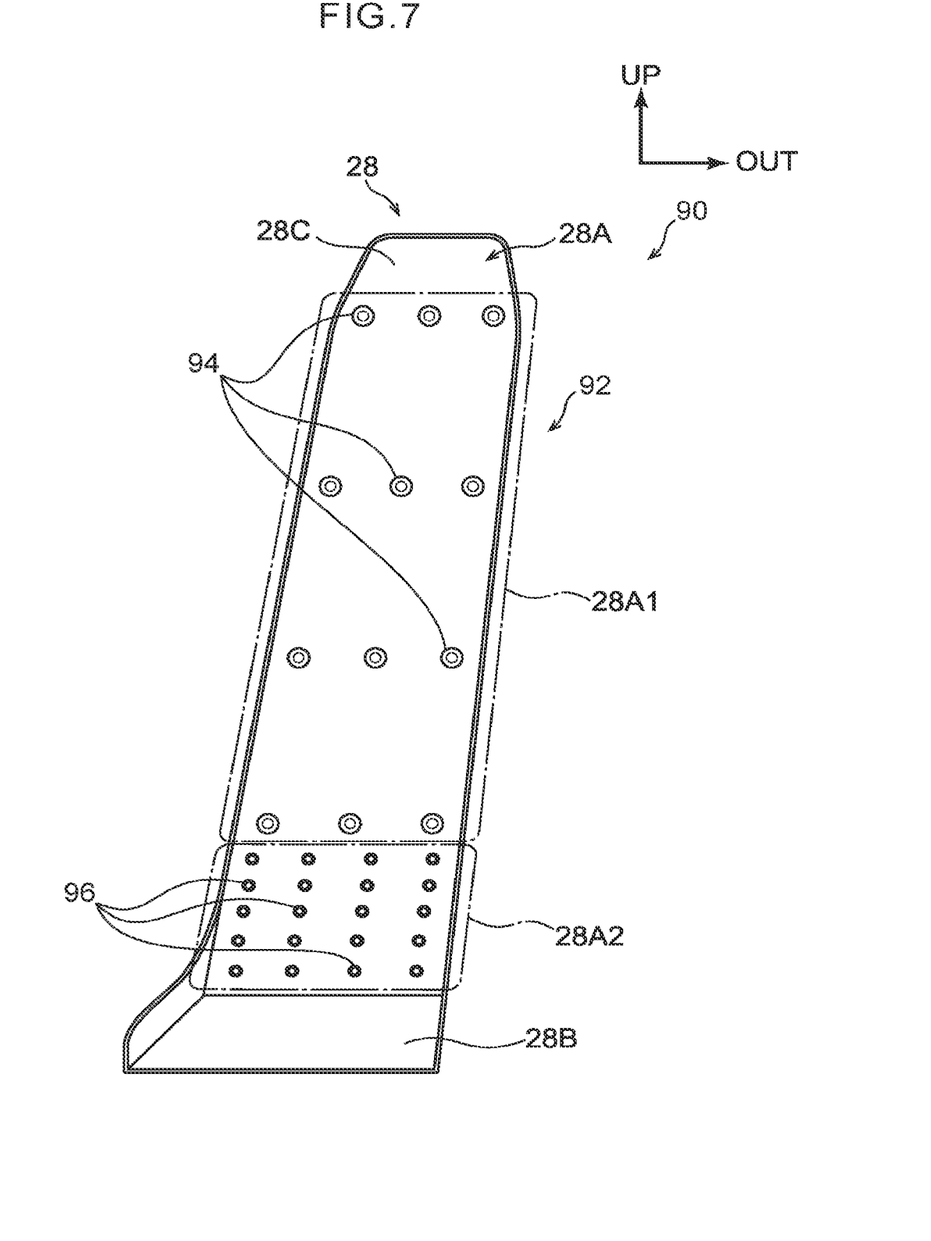
FIG. 7 is a front view (viewed along the direction of arrow 1 in FIG. 5) illustrating a configuration of a vehicle pedal according to a third exemplary embodiment.

Next, explanation follows regarding configuration of a vehicle pedal according to a third exemplary embodiment of the present invention, with reference to FIG. 7. Configuration portions similar to those of the first exemplary embodiment described above are allocated the same reference numerals, and explanation thereof is omitted. Note that FIG. 7 omits illustration of portions of an accelerator pedal 90 according to the present exemplary embodiment other than a pedal body 28.

The third exemplary embodiment differs from the first exemplary embodiment and the second exemplary embodiment in the point that, as a friction regulating section 92, semispherical protrusions are formed in a first region 28A1 and a second region 28A2 configuring a tread portion 28A of the accelerator pedal 90. Namely, the first region 28A1 is formed with semispherical first protrusions 94, and the second region 28A2 is formed with second protrusions 96, configured in semispherical shapes similarly to the first protrusions 94.

More specifically, the first protrusions 94 formed to the first region 28A1 are disposed in three rows at an even spacing along the short direction of the pedal body 28, and disposed in four rows at an even spacing along the longitudinal direction of the pedal body 28. Namely, a total of 12 of the first protrusions 94 are disposed in the first region 28A1.

The second protrusions 96 formed to the second region 28A2 are formed with a slightly smaller profile than the first protrusions 94. The second protrusions 96 are disposed in five rows at an even spacing along the short direction of the pedal body 28 and are disposed in five rows at an even spacing along the longitudinal direction of the pedal body 28. Namely, a total of 25 of the second protrusions 96 are disposed in the second region 28A2. As described above, since the surface area of the second region 28A2 is smaller than the surface area of the first region 28A1, the number of the second protrusions 96 per unit surface area in the second region 28A2 is greater than the number of the first protrusions 94 per unit surface area in the first region 28A1. Note that the numbers and shapes of the first protrusions 94 and the second protrusions 96 may be modified as appropriate as long as the number of the second protrusions 96 per unit surface area in the second region 28A2 is greater than the number of the first protrusions 94 per unit surface area in the first region 28A1.

In the accelerator pedal 90 configured as described above, in a state in which the driver has placed their foot 38 on the first region 28A1, recovery force of the first protrusions 94 that have been pressed by the foot 38 and undergone resilient deformation resists the foot 38 when the foot 38 attempts to move relative to the first region 28A1. In a state in which the driver has placed their foot 38 on the second region 28A2, recovery force of the second protrusions 96 that have been pressed by the foot 38 and undergone resilient deformation resists the foot 38 when the foot 38 attempts to move relative to the second region 28A2. Moreover, as described above, the number of the second protrusions 96 per unit surface area in the second region 28A2 is greater than the number of the first protrusions 94 per unit surface area in the first region 28A1. The coefficient of friction of the second protrusions 96 is accordingly greater than the coefficient of friction of the first protrusions 94 in both the longitudinal direction of the pedal body 28 and the short direction of the pedal body 28. The present exemplary embodiment accordingly exhibits similar operation and advantageous effects to the first exemplary embodiment and the second exemplary embodiment described above, with the exception of operation and advantageous effects due to the friction regulating section 46 being configured including recesses, and operation and advantageous effects due to the configuration of the lattice shaped protrusions.

The first protrusions 94 and the second protrusions 96 project out from the tread portion 28A, and are respectively disposed at separations to each other. It is therefore difficult for mud and the like to get caught between the first protrusions 94 and between the second protrusions 96. This thereby enables easier cleaning of the tread portion 28A of the accelerator pedal 26 in the present exemplary embodiment.

Supplementary Explanation of the Above Exemplary Embodiments (1) In the first exemplary embodiment described above, the first recesses 52 are formed in the first region 28A1, and the second recesses 56 are formed in the second region 28A2. However, protrusions may be provided in the place of these recesses. Specifically, the first region 28A1 may be provided with protrusions, serving as a first textured portion, extending along the longitudinal direction of the pedal body 28 and with a similar shape to the first recesses 52 as viewed face-on. The second region 28A2 may be provided with protrusions, serving as a second textured portion, extending along the short direction of the pedal body 28 and with a similar shape to the second recesses 56 as viewed face-on. Note that protrusions may be provided in place of either the first recesses 52 or the second recesses 56.

The first region 28A1 may be provided with protrusions configured with wavy line shapes as viewed face-on and with their longitudinal direction running along the longitudinal direction of the pedal body 28, and the second region 28A2 may be provided with protrusions configured with wavy line shapes as viewed face-on and with their longitudinal direction running along the short direction of the pedal body 28. In such a configuration, the coefficient of friction of the second region 28A2 in the longitudinal direction of the pedal body 28 is greater than the coefficient of friction of the first region 28A1 in the longitudinal direction of the pedal body 28.

(2) In the first exemplary embodiment described above, a portion of at least one out of the first recesses 52 or the second recesses 56 may be configured with a rib (land portion), thereby splitting the respective first recesses 52 or the second recesses 56 into plural recesses. Such a configuration enables fine adjustment of the coefficients of friction of the first region 28A1 and the second region 28A2.

(3) In the exemplary embodiments described above, the friction regulating section is configured by recesses or protrusions; however, there is no limitation thereto. As an example, the first region 28A1 may be formed with a coarse grain, and the second region 28A2 may be formed with a fine grain. Moreover, configuration may be made in which a the tread portion 28A is formed with a grain that becomes gradually finer on progression from the one end portion 28B side toward the other end portion 28C of the pedal body 28.

(4) In the exemplary embodiments described above, recesses and projections are not provided to the tread portion 28A in a range at the narrowed leading end portion of the pedal body 28. However, recesses and projections may be provided depending on the vehicle model and the size of the accelerator pedal. As an example, the range of the tread portion 28A at the narrowed leading end portion of the pedal body 28 may be set as a third region, and provided with recesses extending along the short direction of the pedal body 28.

(5) In the exemplary embodiments described above, the friction regulating section is provided to the organ type accelerator pedal 26. However, there is no limitation thereto, and a friction regulating section may, for example, be provided to an organ type brake pedal.

The disclosure of Japanese Patent Application No. 2014-224526, filed on Nov. 4, 2014, is incorporated in its entirety by reference herein.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. A vehicle pedal comprising a pedal body that has one end portion and another end portion in a longitudinal direction of the vehicle pedal disposed at a vehicle body floor side, and that is supported so as to be capable of pivoting about the one end portion, wherein:
   a friction regulating section is integrally formed to a tread portion of the pedal body;
   a first region and a second region are configured on the surface of the friction regulating section, a coefficient of friction of the second region in the longitudinal direction is greater than a coefficient of friction of the first region in the longitudinal direction;
   the second region is formed closer to the one end portion of the pedal body than the first region, the first region is applied with tread force from a toe side of a foot of a driver;
   the second region is applied with tread force from a heel side of the foot,
   wherein the friction regulating section includes a first textured portion and a second textured portion, wherein:
   the first textured portion is configured with a plurality of recesses or protrusions, and that is formed in the first region so as to have a smaller coefficient of friction in the longitudinal direction than a coefficient of friction in a lateral direction of the pedal body,
   the second textured portion is configured with a plurality of recesses or protrusions, and that is formed in the second region so as to have a greater coefficient of friction in the longitudinal direction than a coefficient of friction in the lateral direction,
   a longitudinal axis of each of the plurality of recesses or protrusions of the first textured portion extends along the longitudinal direction and is disposed at a predetermined spacing in the lateral direction, and
   a longitudinal axis of each of the plurality of recesses or protrusions of the second textured portion extends along the lateral direction and is disposed at a predetermined spacing in the longitudinal direction, wherein the plurality of recesses of the first textured portion is defined as a plurality of first recesses;

the plurality of recesses of the second textured portion is defined as a plurality of second recesses;

a width of the second recesses is set narrower than a width of the first recesses; and wherein when the second recesses are viewed in cross-section along the lateral direction, a side of the second recesses that is closest to the other end portion comprises a corner portion, and a side of the second recesses that is closest to the one end portion comprises an oblique portion with a depth from the tread portion becoming shallower on progression toward the one end portion.

2. The vehicle pedal of claim 1, wherein:

when the first recesses are viewed in cross-section along the lateral direction, a side of the first recesses that is closest to the end portion comprises an oblique portion with a depth from the tread portion becoming shallower on progression toward the one end portion.

3. A vehicle pedal, comprising a pedal body that has one end portion and another end portion in a longitudinal direction of the vehicle pedal disposed at a vehicle body floor side, and that is supported so as to be capable of pivoting about the one end portion, wherein:

a friction regulating section is integrally formed to a tread portion of the pedal body;

a first region and a second region are configured on the surface of the friction regulating section, a coefficient of friction of the second region in the longitudinal direction is greater than a coefficient of friction of the first region in the longitudinal direction;

the second region is formed closer to the one end portion of the pedal body than the first region, the first region is applied with tread force from a toe side of a foot of a driver;

the second region is applied with tread force from a heel side of the foot, wherein the friction regulating section includes a first textured portion and a second textured portion, wherein:

the first textured portion is configured with a plurality of recesses or protrusions, and that is formed in the first region so as to have a smaller coefficient of friction in the longitudinal direction than a coefficient of friction in a lateral direction of the pedal body, the second textured portion is configured with a plurality of recesses or protrusions, and that is formed in the second region so as to have a greater coefficient of friction in the longitudinal direction than a coefficient of friction in the lateral direction, a longitudinal axis of each of the plurality of recesses or protrusions of the first textured portion extends along the longitudinal direction and is disposed at a predetermined spacing in the lateral direction, and a longitudinal axis of each of the plurality of recesses or protrusions of the second textured portion extends along the lateral direction and is disposed at a predetermined spacing in the longitudinal direction, wherein the plurality of recesses of the first textured portion is defined as a plurality of first recesses;

the plurality of recesses of the second textured portion is defined as a plurality of second recesses;

a width of the second recesses is set narrower than a width of the first recesses;

the width of the second recesses is set as a shorter length than the spacing between the second recesses; and when the second recesses are viewed in cross-section along the lateral direction, a side of the second recesses that is closest to the other end portion comprises a corner portion, and a side of the second recesses that is closest to the one end portion comprises an oblique portion with a depth from the tread portion becoming shallower on progression toward the one end portion.

4. The vehicle pedal of claim 3, wherein:

when the first recesses are viewed in cross-section along the lateral direction, a side of the first recesses that is closest to the one end portion comprises an oblique portion with a depth from the tread portion becoming shallower on progression toward the one end portion.

* * * * *